United States Patent Office 3,659,019
Patented Apr. 25, 1972

3,659,019
PHARMACEUTICAL COMPOSITIONS COMPRISING CERTAIN 1-PHENOXY-2-AMINO-ALKANES
Herbert Koppe, Karl Zeile, Werner Kummer, Helmut Stahle, and Peter Danneberg, Ingelheim am Rhein, Germany, assignors to Boehringer Ingelheim G.m.b.H., Ingelheim am Rhein, Germany
No Drawing. Application Nov. 14, 1969, Ser. No. 871,619, which is a continuation-in-part of application Ser. No. 667,665, Sept. 14, 1967. Divided and this application Nov. 4, 1970, Ser. No. 86,982
Claims priority, application Germany, Sept. 16, 1966, B 88,950; Aug. 17, 1967, B 94,024
Int. Cl. A61k 27/00
U.S. Cl. 424—330
3 Claims

ABSTRACT OF THE DISCLOSURE

Pharmaceutical compositions comprising as an active ingredient a 1-phenoxy-2-amino-alkane of the formula

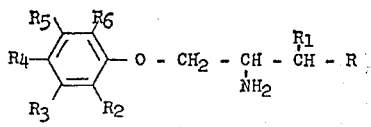

wherein $R_1$ is hydrogen or alkyl of 1 to 2 carbon atoms, and
$R$ is hydrogen or alkyl of 1 to 3 carbon atoms,
$R_2$ through $R_6$, which may be identical to or different from each other, are each hydrogen or alkyl of 1 to 5 carbon atoms, but preferably 1 to 2 carbon atoms;

provided, however, that at least one of $R_1$ through $R_6$ is other than hydrogen, and if $R_1$ and $R_4$ are both methyl, at least one of the remaining substituents $R$, $R_2$, $R_3$, $R_5$ and $R_6$ is other than hydrogen; or a non-toxic, pharmacologically acceptable acid addition salt thereof; the compositions are useful as anticonvulsants and respiration-analeptics in warm-blooded animals.

This is a division of copending application Ser. No. 871,619, filed Nov. 14, 1969, now abandoned, which in turn is a continuation of application Ser. No. 667,665, filed Sept. 14, 1967, now abandoned.

This invention relates to pharmaceutical compositions comprising as an active ingredient a 1-phenoxy-2-amino-alkane or a non-toxic acid addition salt thereof, as well as to a method of alleviating convulsions and stimulating the respiration in warm-blooded animals therewith.

More particularly, the instant invention relates to pharmaceutical compositions comprising as an active ingredient a racemic mixture or optically active antipode of a 1-phenoxy-2-amino-alkane of the formula

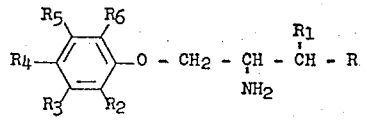

wherein $R$ is hydrogen or alkyl of 1 to 3 carbon atoms,
$R_1$ is hydrogen or alkyl of 1 to 2 carbon atoms, and
$R_2$ through $R_6$, which may be identical to or different from each other, are each hydrogen or alkyl of 1 to 5 carbon atoms, but preferably 1 to 2 carbon atoms;

provided, however, that at least one of $R_1$ through $R_6$ is other than hydrogen and, if $R_1$ and $R_4$ are both methyl, at least one of the remaining substituents $R$, $R_2$, $R_3$, $R_5$ and $R_6$ is other than hydrogen; or a non-toxic, pharmacologically acceptable acid addition salt thereof.

The compounds of the Formula I above may be prepared by a number of methods involving well known chemical principles, among which the following have proved to be particularly convenient and efficient:

METHOD A

By splitting off one or two monovalent or one bivalent protective group from a compound of the formula

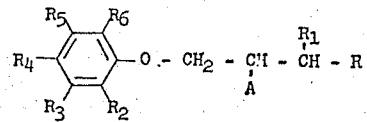

wherein R and $R_1$ through $R_6$ have the same meanings as in Formula I, and A is a secondary or tertiary amino group having one or two readily removable protective substituents, such as benzyl, phthalyl, toluenesulfonyl or formyl, attached thereto. The removal of the protective group may be achieved by conventional methods, such as by catalytic hydrogenation.

A starting compound of the Formula II may be obtained by reacting a correspondingly substituted 1-phenoxy-2-halo-alkane with a suitable primary or secondary amine, or by reacting a correspondingly substituted 1-phenoxy-2-oxo-alkane with a suitable primary amine under reducing conditions.

METHOD B

By reacting a compound of the formula

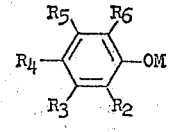

wherein $R_2$ through $R_6$ have the same meanings as in Formula I, and M is hydrogen or a metal cation, with a compound of the formula

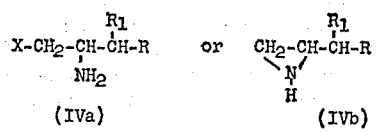

wherein R and $R_1$ have the same meanings as in Formula I, and X is the radical of a reactive ester, such as a halogen atom, particularly chlorine or bromine.

A compound of the Formula IVa or IVb may be prepared by conventional methods, such as those described in British Pat. No. 765,849 or in Houben-Weyl, 4th Edition (1958, vol. XI/2, pp. 228–230.

METHOD C

By reducing a compound of the formula

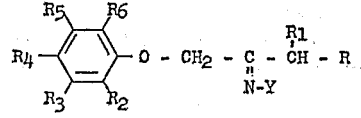

wherein R and $R_1$ through $R_6$ have the same meanings as in Formula I, and Y is hydrogen, hydroxyl or amino, with catalytically activated hydrogen or a complex metal hydride.

A starting compound of the Formula V may be obtained by reacting a correspondingly substituted 1-phenoxy-2-oxo-alkane with ammonia, hydroxylamine or hydrazine. A suitably substituted 1-phenoxy-2-oxo-alkane, in turn, may be obtained by reacting a phenolate of the Formula III with a 1-halo-2-oxo-alkane of suitable chain length.

The compounds of the Formula I above contain an asymmetrically substituted carbon atom bonded to the free amino group and, therefore, occur in the form of racemic mixtures as well as optically active antipodes. The racemic mixtures may be divided into their optically active antipode components by conventional methods, for instance, by salt formation with optically active acids such as D-3-bromocamphor-8-sulfonic acid or dibenzoyl-D-tartaric acid. Another method of obtaining an optical antipode is by starting with the corresponding optically active antipode of compound II in method A.

The compounds of the Formula I are organic bases and therefore form acid addition salts with inorganic or organic acids. Such acid addition salts may be obtained in customary fashion, such as by dissolving the free base in a suitable solvent and acidifying the solution with the desired inorganic or organic acid. Examples of non-toxic, pharmacologically acceptable acid addition salts are those formed with hydrochloric acid, hydrobromic acid, sulfuric acid, maleic acid, acetic acid, oxalic acid, lactic acid, tartaric acid, succinic acid, methanesulfonic acid, 8-chlorotheophylline or the like.

The following examples further illustrate the present invention and will enable others skilled in the art to understand it more completely. It should be understood, however, that the invention is not limited to the particular examples given below.

EXAMPLE 1

Preparation of 1-(2',6'-dimethyl-phenoxy)-2-amino-propane and its hydrochloride by method C 245 gm. of 1-(2',6'-dimethyl-phenoxy)-propanone-(2)-oxime were dissolved in 1300 cc. of methanol, and the solution was hydrogenated at 5 atmospheres gauge and 60° C. in the presence of Raney nickel. After the calculated amount of hydrogen had been absorbed, the catalyst was filtered off, the methanol was distilled out of the filtrate, and the residue, raw 1-(2',6'-dimethyl-phenoxy)-2-amino-propane, was dissolved in ethanol. The resulting solution was acidified with ethereal hydrochloric acid, the acidic solution was allowed to cool, and the precipitate formed thereby was collected by vacuum filtration. The filter cake was dissolved in ethanol and recrystallized therefrom by addition of ether. 140.5 gm. (51.5% of theory) of a substance having a melting point of 203–205° C. were obtained, which was identified to be 1-(2',6'-dimethyl-phenoxy)-2-amino-propane hydrochloride of the formula

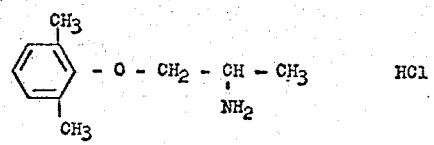

EXAMPLE 2

Using a procedure analogous to that described in Example 1, 1-(3'-methyl-phenoxy)-2-amino-propane was prepared from 1-(3'-methyl-phenoxy)-propanone-(2)-oxime. Its hydrochloride had a melting point of 139–140° C.

EXAMPLE 3

Using a procedure analogous to that described in Example 1, 1-(4'-methyl-phenoxy)-2-amino-propane was prepared from 1-(4'-methyl-phenoxy)-propanone-(2)-oxime. Its hydrochloride had a melting point of 151–152° C.

EXAMPLE 4

Using a procedure analogous to that described in Example 1, 1-(4'-methyl-phenoxy)-2-amino-pentane was prepared from 1-(4'-methyl-phenoxy-pentanone-(2)-oxime. Its hydrochloride had a melting point of 137–138° C.

EXAMPLE 5

Using a procedure analogous to that described in Example 1, 1-(2',4'-dimethyl-phenoxy)-2-amino-propane was prepared from 1-(3',4'-dimethyl-phenoxy)-propanone-(2)-oxime. Its hydrochloride had a melting point of 213–214° C.

EXAMPLE 6

Using a procedure analogous to that described in Example 1, 1-(3',4'-dimethyl-phenoxy)-2-amino-propane was prepared from 1-(3',4'-dimethyl-phenoxy)-propanone-(2)-oxime. Its hydrochloride had a melting point of 162–164° C.

EXAMPLE 7

Using a procedure analogous to that described in Example 1, 1-(3',5'-dimethyl-phenoxy)-2-amino-propane was prepared from 1-(3',5'-dimethyl-phenoxy)-propanone-(2)-oxime. Its hydrochloride had a melting point of 211–213° C.

EXAMPLE 8

Preparation of 1-(2',6'-dimethyl-phenoxy)-2-aminobutane and its hydrochloride by method C 18.3 gm. (0.095 mol) of 1-(2',6'-dimethyl-phenoxy)-butanone-(2) were refluxed with 14 gm. (0.2 mol) of hydroxylamine hydrochloride in 100 cc. of ethanol in the presence of 25 cc. of water and 20 cc., of pyridine, yielding 17.6 gm. of raw 1-(2',6'-dimethyl-phenoxy)-butanone-(2)-oxime, which was dissolved in 50 cc. of methanol, and the solution was hydrogenated at 60° C. and 5 atmospheres gauge in the presence of Raney nickel. After the calculated amount of hydrogen had been absorbed, the catalyst was filtered off, the methanol was distilled out of the filtrate, the residue digested with water, the aqueous mixture was acidified with hydrochloric acid, and the neutral component was extracted with ether. The acid aqueous phase was made alkaline with ammonia, the oily precipitate formed thereby was taken up in ether, the ethereal solution was dried over magnesium sulfate, and the ether was distilled off. The residue, 12.6 gm. of 1-(2',6'-dimethyl-phenoxy)-2-amino-butane, was dissolved in ethanol, the resulting solution was acidified with ethereal hydrochloric acid, and the crystalline precipitate formed thereby was collected and recrystallized twice from ethanol/ether. 8.2 gm. of a substance having a melting point of 210–211° C. was obtained, which was identified to be 1-(2',6'-dimethyl-phenoxy-2-amino-butane hydrochloride of the formula

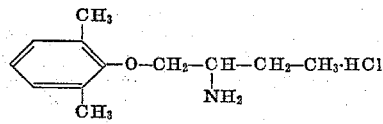

EXAMPLE 9

Preparation of 1-(3',5'-dimethyl-phenoxy)-2-aminobutane and its hydrochloride by method C 11 gm. of 1-(3',5'-dimethyl-phenoxy)-butanone-(2) were refluxed with 8 gm. of hydroxylamine in 100 cc. of ethanol and in the presence of 100 cc. of pyridine and 10 cc. of water. Thereafter, the ethanol was distilled off in vacuo, and the residue was digested with water and then extracted with ether. The ether extract solution was dried with magnesium sulfate, and the dry solution was evaporated, leaving 15 gm. of 1-(3',5'-dimethyl-phenoxy)-butanone-(2)-oxime, which were dissolved in methanol. The resulting solution was hydrogenated at 40° C. and 5 atmospheres gauge in the presence of Raney nickel. After the calculated amount of hydrogen had been absorbed, the catalyst was filtered off, the methanol was distilled out of the filtrate, leaving 10 gm. of raw 1-(3',5'-dimethyl-phenoxy)-2-amino-butane, which were dissolved in ethanol, and the resulting solution was acidified with ethereal hydrochloric acid. The precipitate formed thereby was collected and recrystallized from a mixture of ethanol and ether, yielding 7.6 gm. of a substance having a melting point of 166–168° C., which was identified to be 1-(3',5'-dimethyl-phenoxy) - 2 - amino-butane hydrochloride of the formula

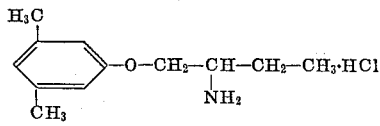

EXAMPLE 10

Preparation of 1-(2',4',6'-trimethyl-phenoxy)-2-aminopropane and its hydrochloride by method C 20.7 gm. (0.1 mol) of 1-(2',4',6'-trimethyl-phenoxy)-propanone-(2)-oxime were dissolved in 250 cc. of methanol, and the solution was hydrogenated at 60° C. and 5 atmospheres gauge in the presence of Raney nickel until the calculated amount of nitrogen had been absorbed. Thereafter, the catalyst was filtered off, and the methanol was distilled out of the filtrate in vacuo, leaving 14 gm. (67% of theory) of 1-(2',4',6'-trimethyl-phenoxy-2-amino-propane, which were dissolved in ethanol. The ethanolic solution was acidified with ethereal hydrochloric acid, and the precipitate formed thereby was collected, recrystallized from ethanol by addition of ether, and dried. 10.1 gm. (50% of theory) of a pure white crystalline substance having a melting point of 198–199° C. were obtained. It was identified to be 1-(2',4',6'-trimethyl-phenoxy)-2-amino - propane hydrochloride of the formula

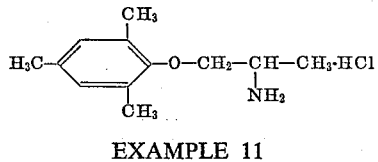

EXAMPLE 11

Using a procedure analogous to that described in Example 10, 1 - (3',4',5' - trimethyl - phenoxy) - 2 - aminopropane was prepared from 1 - (3',4',5'-trimethyl - phenoxy)-propanone-(2)-oxime. Its hydrochloride had a melting point of 216–217° C.

EXAMPLE 12

Using a procedure analogous to that described in Example 10, 1 - (2',3',5' - trimethyl - phenoxy) - 2 - aminopropane was prepared from 1-(2',3',5'-trimethyl-phenoxy) propanone-(2)-oxime. Its hydrochloride had a melting point of 163–164° C.

EXAMPLE 13

Using a procedure analogous to that described in Example 10, 1 - (2',4',6' - trimethyl - phenoxy)-2-aminobutane was prepared from 1-(2',4',6'-trimethyl-phenoxy)-butanone-(2)-oxime. Its hydrochloride had a melting point of 257–258° C.

EXAMPLE 14

Using a procedure analogous to that described in Example 10, 1 - (2',4',5' - trimethyl - phenoxy)-2-aminopropane was prepared from 1-(2',4',5'-trimethyl - phenoxy) - propanone-(2)-oxime. Its hydrochloride had a melting point of 181–183° C.

EXAMPLE 15

Using a procedure analogous to the described in Example 10, 1 - (2',3',5'-trimethyl - phenoxy)-2-aminobutane was prepared from 1-(2',3',5'-trimethyl-phenoxy)-butanone-(2)-oxime. Its hydrochloride had a melting point of 160–162° C.

EXAMPLE 16

Using a procedure analogous to that described in Example 10, 1 - (2',3',6' - trimethyl - phenoxy)-2-aminopropane was prepared from 1 - (2',3',6' - trimethyl-phenoxy)-propanone-(2)-oxime. Its hydrochloride had a melting point of 214–215° C.

EXAMPLE 17

Using a procedure analogous to that described in Example 10, 1-(2',4',5'-trimethyl-phenoxy) - 2 - aminobutane was prepared from 1-(2',4',5'-trimethyl-phenoxy)-butanone - (2) - oxime. Its hydrochloride had a melting point of 160–165° C.

EXAMPLE 18

Using a procedure analogous to that described in Example 10, 1 - (3',4',5' - trimethyl - phenoxy) - 2 - aminobutane was prepared from 1-(3',4',5'-trimethyl-phenoxy)-butanone-(2)-oxime. Its hydrochloride had a melting point of 173–174° C.

EXAMPLE 19

Using a procedure analogous to that described in Example 10, 1-(2',3',6'-trimethyl-phenoxy) - 2 - aminobutane was prepared from 1-(2',3',6'-trimethyl-phenoxy)-butanone-(2)-oxime. Its hydrochloride had a melting point of 241–243° C.

EXAMPLE 20

Using a procedure analogous to that described in Example 10, 1 - (2',4' - dimethyl-phenoxy) - 2 - aminobutane was prepared from 1-(2',4'-dimethyl-phenoxy)-butanone-(2)-oxime. Its hydrochloride had a melting point of 176–178° C.

EXAMPLE 21

Using a procedure analogous to that described in Example 10, 1-(3',4'-dimethyl-phenoxy)-2-amino-butane was prepared from 1-(3',4'-dimethyl-phenoxy)-butanone-(2)-oxime. Its hydrochloride had a melting point of 138–140° C.

EXAMPLE 22

Using a procedure analogous to that described in Example 10, 1-(2',3'-dimethyl-phenoxy)-2-amino-butane was prepared from 1-(2',3'-dimethyl-phenoxy)-butanone-(2)-oxime. Its hydrochloride had a melting point of 204–206° C.

EXAMPLE 23

Using a procedure analogous to that described in Example 10, 1-(2',5'-dimethyl-phenoxy)-2-amino-butane was prepared from 1-(2',5'-dimethyl-phenoxy)-butanone-(2)-oxime. Its hydrochloride had a melting point of 138–140° C.

EXAMPLE 24

Preparation of 1-(3'-methyl-phenoxy)-2-amino-pentane and its hydrochloride by method C 9.6 gm. (0.05 mol) of 1-(3'-methyl-phenoxy)-pentanone-(2) were dissolved in a mixture of 75 cc. of ethanol and 8.5 gm. of ammonia, and the solution was allowed to stand for fourteen hours at room temperature. Thereafter, a solution of 3.7 gm. of sodium borohydride in 100 cc. of ethanol was added dropwise at 20 C., while stirring, and the resulting mixture was stirred for one hour more at 45–50° C. and was then made acid with hydrochloric acid. Subsequently, the ethanol was completely distilled off, the acid residue was extracted with ether, was then made alkaline with sodium hydroxide, and was again extracted with ether. The basic extract solution, containing 1(3'-methyl-phenoxy)-2-amino-pentane, was washed twice with water, dried over magnesium sulfate, and was made acid with freshly prepared ethereal hydrochloric acid. 5.1 gm. (44.3% of theory) of a pure white substance having a melting point of 142–143° C. were obtained. It was identified to be 1-(3'-methyl-phenoxy)-2-aminoamino-pentane hydrochloride of the formula

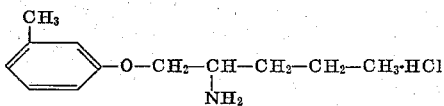

EXAMPLE 25

Using a procedure analogous to that described in Example 24, 1-(2',6'-dimethyl-phenoxy)-2-amino-pentane and its hydrochloride, M.P. 230–231° C., were prepared from 1-(2',6'-dimethyl-phenoxy)-pentanone-(2).

EXAMPLE 26

Using a procedure analogous to that described in Example 24, 1-(2'-methyl-phenoxy)-2-amino-pentane and its hydrochloride, M.P. 162–163.5° C., were prepared from 1-(2'-methyl-phenoxy)-pentanone-(2).

EXAMPLE 27

Using a procedure analogous to that described in Example 24, 1-(4'-methyl-phenoxy)-2-amino-3-methyl-butane and its hydrochloride, M.P. 172–173° C., of the formula

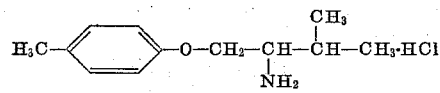

were prepared from 1-(4'-methyl-phenoxy)-3-methyl-butanone-(2).

EXAMPLE 28

Using a procedure analogous to that described in Example 24, 1-(2',6'-dimethyl-phenoxy)-2-amino-3-methyl-butane and its hydrochloride, M.P. 170° C., were prepared from 1-(2',6'-dimethyl-phenoxy)-3-methyl-butanone-(2).

EXAMPLE 29

Preparation of 1-(2',3'-dimethyl-phenoxy)-2-amino-propane hydrochloride by method A 17 gm. (0.055 mol) of 1-(2',3'-dimethyl-phenoxy)-2-benzylamino-propane hydrochloride were dissolved in 100 cc. of methanol and a small amount of water, and the solution was hydrogenated at 80° C. and 5 atmospheres gauge in the presence of paladium chloride as a catalyst. After hydrogen absorption was complete the catalyst was filtered off, and the methanol was distilled out of the filtrate in vacuo. The solid residue was dissolved in ethanol and recrystallized therefrom by addition of ether. 6.5 gm. of 1-(2',3'-dimethyl-phenoxy)-2-amino-propane hydrochloride, M.P. 189–192° C. were obtained.

EXAMPLE 30

Using a procedure analogous to that described in Example 29, 5.9 gm. of 1-(2',5'-dimethyl-phenoxy)-2-aminopropane hydrochloride, M.P. 140–142° C., were obtained from 14.5 gm. of 1-(2',5'-dimethyl-phenoxy)-2-benzylamino-propane hydrochloride.

EXAMPLE 31

Preparation of 1-2',6'-dimethyl-phenoxy)-2-aminohexane and its hydrochloride by method C 13 gm. (0.05 mol) of 1-(2',6'-dimethyl-phenoxy)-hexanone-2)-oxime, obtained from 2',6'-dimethyl-phenoxymethyl-n-butyl ketone and hydroxylamine hydrochloride, were dissolved in methanol, and the solution was hydrogenated in a shaker autoclave at 60° C. and 5 atmospheres gauge in the presence of Raney nickel as a catalyst. After the theoretical amount of hydrogen had been absorbed, the catalyst was removed by vacuum filtration, and the methanol was distilled out of the filtrate. The residue was dissolved in ether, the solution was filtered to remove insoluble matter, and the filtrate, an ethereal solution of the free base 1-(2',6'-dimethyl-phenoxy)-2-amino-hexane, was acidified with ethereal hydrochloric acid to acid reaction of Congo red. The white crystalline precipitate formed thereby was collected by vacuum filtration, and the filter cake was washed with ether and dried. 4.0 gm. (31.1% of theory) of analytically pure and thin-layer chromatographically uniform 1-(2',6'-dimethyl-phenoxy)-2-amino-hexane hydrochloride, M.P. 209–211° C., of the formula

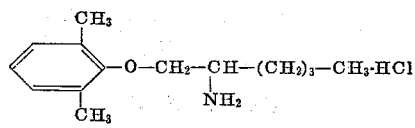

was obtained.

EXAMPLE 32

Preparation of 1-(3'-methyl-phenoxy)-2-amino-propane and its hydrochloride by method B 45.4 gm. (0.43 mol) of m-cresol were dissolved in 200 cc. of chloroform, and then, while refluxing and stirring the solution, a solution of 7.98 gm. (0.14 mol) of propylenimine in 50 cc. of chloroform was added dropwise thereto over a period of fifteen minutes. Thereafter, the reaction solution was refluxed for ninety minutes more, and then the chloroform was distilled off. The residue was taken up in ether, and the resulting ethereal solution was first extracted with sodium hydroxide and then with dilute hydrochloric acid. The hydrochloric acid extract solution was made alkaline with sodium hydroxide and was then extracted with ether, and the ethereal extract was dried over magnesium sulfate and evaporated. The residue, 1-(3'-methyl-phenoxy)-2-amino-propane, was taken up in ether, and the resulting solution was acidified with ethereal hydrochloric acid. The precipitate formed thereby was collected and recrystallized from a mixture of ethanol and ether, yielding 1-(3'-methyl-phenoxy)-2-amino-propane hydrochloride, M.P. 139–140° C.

EXAMPLE 33

Preparation of 1-(2',6'-dimethyl-phenoxy)-2-amino-3-methyl-butane and its hydrochloride by method C 10.3 gm. (0.05 mol) of 1-(2',6'-dimethyl-phenoxy)-3-methyl-butanone-(2) were dissolved in a mixture of 75 cc. of ethanol and 8.5 gm. of ammonia, and the resulting solution was allowed to stand for sixteen hours at 20° C. Thereafter, while stirring, a solution of 3.7 gm. of sodium borohydride in 100 cc. of ethanol was added dropwise at 20° C., the mixture was stirred for one hour more and was then acidified with hydrochloric acid. The acid solution was evaporated in vacuo, the residue was admixed with water, and the aqueous mixture was extracted with ether. The aqueous phase was made alkaline with sodium hydroxide, the precipitate formed thereby was extracted with ether, the ethereal solution was dried over magnesium sulfate, the ether was distilled off, the residue, the free base 1-(2',6'-dimethyl-phenoxy)-2-amino-3-methyl-butane, was taken up in methanol, and the resulting solution was acidified with ethereal hydrochloric acid. The precipitate formed thereby was collected and recrystallized from a mixture of methanol and ether, yielding 6.2 gm. of 1 - (2',6'-dimethyl-phenoxy)-2-amino-3-methyl-butane hydrochloride, M.P. 170° C.

The compounds of the Formula I and their nontoxic, pharmacologically acceptable acid addition salts have useful pharmacodynamic properties. More particularly, they exhibit long-lasting anticonvulsive activities without significant concurrent sedative side effects in warm-blooded animals, such as rats and mice, as well as respiration-analeptic activities.

Particularly useful as anticonvulsives are the 1-phenoxy-2-amino-propanes and -butanes of the Formula I which have two alkyl substituents of 1 to 2 carbon atoms attached to the phenyl rings, especially in the 2- and 4-or 2- and 6-positions.

Also especially effective as anticonvulsives are those compounds of the Formula I wherein the phenyl ring has a methyl or ethyl substituent attached in the 2-position and two additional alkyl substituents in the 3-, 4- or 5-positions. Examples of specific compounds which are highly effective as anticonvulsives are 1-(2',6'-dimethyl-phenoxy)-2-amino-propane and its hydrochloride, 1-(2',6'-dimethyl-phenoxy)-2-amino-pentane and its hydrochloride, and 1-(2',3',5'-trimethyl-phenoxy)-2-amino-butane and its hydrochloride.

Particularly effective as respiration-analeptics are those compounds of the Formula I wherein the phenyl ring has a methyl or ethyl substituent attached in the 4-position, such as 1-(4-tolyloxy)-2-amino-propane and its nontoxic acid addition salts.

For pharmaceutical purposes, the compounds according to the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, capsules, wafers, solutions, suspensions, emulsions, syrups, suppositories or the like. One dosage unit of the compounds according to the present invention for peroral administration is from 0.016 to 5 mgm./kg. body weight, preferably 0.5 to 3.3 mgm./kg. body weight. For parenteral administration, one dosage unit of the compounds of the invention is from 0.0016 to 0.33 mgm./kg. body weight.

A dosage unit composition pursuant to the instant invention may comprise one or more of the compounds of the invention as an active ingredient, provided the total unit dosage range set forth above is not exceeded. In addition, such a dosage unit composition may comprise a unit dose of one or more other pharmacodynamically active components, such as a tranquilizer of the benzodiazepine or phenothiazine type, or a spasmolytic of the scopolamine type.

The following examples illustrate a few dosage unit compositions comprising a compound according to the present invention as an active ingredient, and represent the best mode contemplated of putting the invention to practical use. The parts are parts by weight, unless otherwise specified.

EXAMPLE 34

Tablets

The tablet composition was compounded from the following ingredients:

| | Parts |
|---|---|
| 1 - (2',6' - dimethyl - phenoxy) - 2 - amino - propane hydrochloride | 75.0 |
| Lactose | 25.0 |
| Secondary calcium phosphate | 150.0 |
| Corn starch | 206.0 |
| Colloidal silicic acid | 12.0 |
| Stearic acid | 4.0 |
| Soluble starch | 8.0 |
| Total | 480.0 |

Compounding procedure.—The phenoxypropane compound was intimately admixed with the lactose, the calcium phosphate, the corn starch and the silicic acid, the resulting mixture was moistened with an aqueous solution of the soluble starch, and the moist mass was forced through a 1.5-mm. mesh screen. The moist granulate thus obtained was dried, admixed with the stearic acid, and the mixture was pressed into 480-mgm. tablets with the aid of a conventional tablet-making machine. Each tablet contained 75 mgm. of the phenoxypropane compound and, when administered perorally to a warm-blooded animal of about 60 kg. body weight in need of such treatment, produced very good anticonvulsive and respiration-analeptic effects.

EXAMPLE 35

Coated pills

The pill core composition was compounded from the following ingredients:

| | Parts |
|---|---|
| 1 - (2',4' - dimethyl - phenoxy) - 2 - amino - propane hydrochloride | 45 |
| 1 - (4' - methyl - phenoxy) - 2 - amino - propane hydrochloride | 30 |
| Secondary calcium phosphate | 120 |
| Corn starch | 91 |
| Colloidal silicic acid | 7 |
| Magnesium stearate | 4 |
| Polyvinylpyrrolidone | 3 |
| Total | 300 |

Compounding procedure.—The phenoxypropane compounds, the calcium phosphate, the corn starch and the silicic acid were intimately admixed with each other, the mixture was moistened with an aqueous solution of the polyvinylpyrrolidone, and the moist mass was forced through a 1.5-mm. mesh screen. The moist granulate thus obtained was dried, admixed with the magnesium stearate, and the mixture was pressed into 300-mgm. pill cores with the aid of a conventional tablet-making machine. The pill cores were subsequently coated with a thin shell of a coating composition consisting essentially of sugar, titaniumdioxide, talcum, gum arabic and polyvinylpyrrolidone. Each coated pill contained 45 mgm. of the dimethylphenoxy-amino-propane compound and 30 mgm. of the methylphenoxy-amino-propane compound and, when administered perorally to a warm-blooded animal of about 60 kg. body weight in need of such treatment, produced very good respiration-analeptic and anticonvulsive effects.

EXAMPLE 36

Gelatin capsules

The capsule filler composition was compounded from the following ingredients:

| | Parts |
|---|---|
| 1 - (2',4' - dimethyl - phenoxy) - 2 - amino - propane maleate | 50 |
| Lactose | 150 |
| Total | 200 |

Compounding procedure.—The phenoxypropane compound and the lactose were intimately admixed with each other, and 200-mgm. portions of the mixture were filled into individual gelatin capsules of suitable size. Each capsule contained 50 mgm. of the phenoxypropane compound and, when administered perorally to a warm-blooded animal of about 60 kg. body weight in need of such treatment, produced very good respiration-analeptic and anticonvulsive effects.

EXAMPLE 37

Tablets containing a compound of the invention and a tranquilizer

The tablet composition was compounded from the following ingredients:

| | Parts |
|---|---|
| 1-(2',6'-dimethyl-phenoxy)-2-amino-propane | 60 |
| 5 - phenyl - 7 - chloro - 1,3 - dihydro - 3 - hydroxy-2H-1,4-benzodiazepin-2-one | 30 |
| Calcium phosphate | 150 |
| Corn starch | 206 |
| Colloidal silicic acid | 12 |
| Magnesium stearate | 4 |
| Soluble starch | 8 |
| Total | 470 |

Compounding procedure.—The phenoxypropane compound, the benzodiazepinone compound, the calcium phosphate, the corn starch and the silicic acid were intimately admixed with each other, the mixture was moistened with an aqueous solution of the soluble starch, and the moist mass was forced through a 1.5-mm. mesh screen. The moist granulate thus obtained was dried, admixed with the magnesium stearate, and the mixture was pressed into 470-mgm. tablets with the aid of a conventional tablet-making machine. Each tablet contained 60 mgm. of the phenoxypropane compound and 30 mgm. of the benzodiazepinone compound and, when administered perorally to a warm-blooded animal of about 60 kg. body weight in need of such treatment, produced very good anticonvulsive, respiration-analeptic and tranquilizing effects.

EXAMPLE 38

Hypodermic solution

The solution was compounded from the following ingredients:

| | Parts by vol. |
|---|---|
| 1 - (2′,6′ - dimethyl - phenoxy) - 2 - amino - propane hydrochloride | 2.5 |
| Sodium salt of EDTA | 0.2 |
| Distilled water | Q.s. ad 1000.0 |

Compounding procedure.—The phenoxypropane compound and the EDTA salt were dissolved in a sufficient amount of distilled water, the solution was filtered until free from suspended particles, the filtrates was filled into 2-cc. ampules, and the filled ampules were sterilized at 120° C. for twenty minutes and then sealed. Each ampule contained 5 mgm. of the phenoxypropane compound, and when the contents of one ampule were administered by intramuscular injection to a warm-blooded animal of about 60 kg. body weight in need of such treatment, they produced very good anticonvulsive and respiration-analeptic effects.

Analogous results were obtained when any one of the other compounds embraced by Formula I or a non-toxic acid addition salt thereof was substituted for the particular 1-phenoxy-2-amino-alkane compound in Examples 34 through 38. Likewise, the amount of active ingredient in these illustrative examples may be varied to achieve the dosage-unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. The method of suppressing convulsions and stimulating respiration in a warm-blooded animal in need of such treatment, which comprises perorally or parenterally administering to said animal a pharmaceutical composition consisting essentially of an inert pharmaceutical carrier and an effective anticonvulsive and respiration-analeptic amount of a racemic mixture or optically active antipode of a compound of the formula

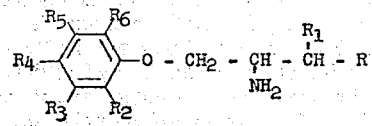

wherein
R is hydrogen or alkyl of 1 to 3 carbon atoms,
$R_1$ is hydrogen or alkyl of 1 to 2 carbon atoms, and
$R_2$ through $R_6$ are each hydrogen or alkyl of 1 to 5 carbon atoms;

provided, however, that at least one of $R_1$ through $R_6$ is other than hydrogen and, if $R_1$ and $R_4$ are both methyl, at least one of the remaining substituents R, $R_2$, $R_3$, $R_5$ and $R_6$ is other than hydrogen; or a non-toxic, pharmalogically acceptable acid addition salt thereof.

2. The method according to claim 1, wherein said compound is one of the formula

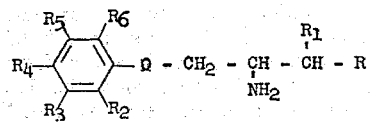

wherein
R is hydrogen or alkyl of 1 to 3 carbon atoms,
$R_1$ is hydrogen or alkyl of 1 to 2 carbon atoms, and
$R_2$ through $R_6$ are each hydrogen or alkyl of 1 to 2 carbon atoms;

provided, however, that at least one of $R_1$ through $R_6$ is other than hydrogen and, if $R_1$ and $R_4$ are both methyl, at least one of the remaining substituents R, $R_2$, $R_3$, $R_5$ and $R_6$ is other than hydrogen; or a non-toxic, phramacologically acceptable acid addition salt thereof.

3. The method according to claim 1, wherein said compound is selected from the group consisting of 1-(2′,6′ - dimethyl - phenoxy)-2-amino-propane, 1-(2′,4′-dimethyl - phenoxy) - 2-amino-propane, 1-(4′-methyl-phenoxy)-2-amino-propane and their non-toxic, pharmacologically acceptable acid addition salts.

References Cited

UNITED STATES PATENTS

| 2,683,719 | 7/1954 | Kerwin et al. | 260—332.3 |
| 2,765,338 | 10/1956 | Suter et al. | 260—562 |

OTHER REFERENCES

| 297,266 | 5/1954 | Switzerland | 260—570.7 |
| 297,265 | 5/1954 | Switzerland | 260—570.7 |
| 297,690 | 6/1954 | Switzerland | 260—570.7 |

STANLEY J. FRIEDMAN, Primary Examiner

U.S. Cl. X.R.

260—253, 501.17, 501.19, 570.7